UNITED STATES PATENT OFFICE.

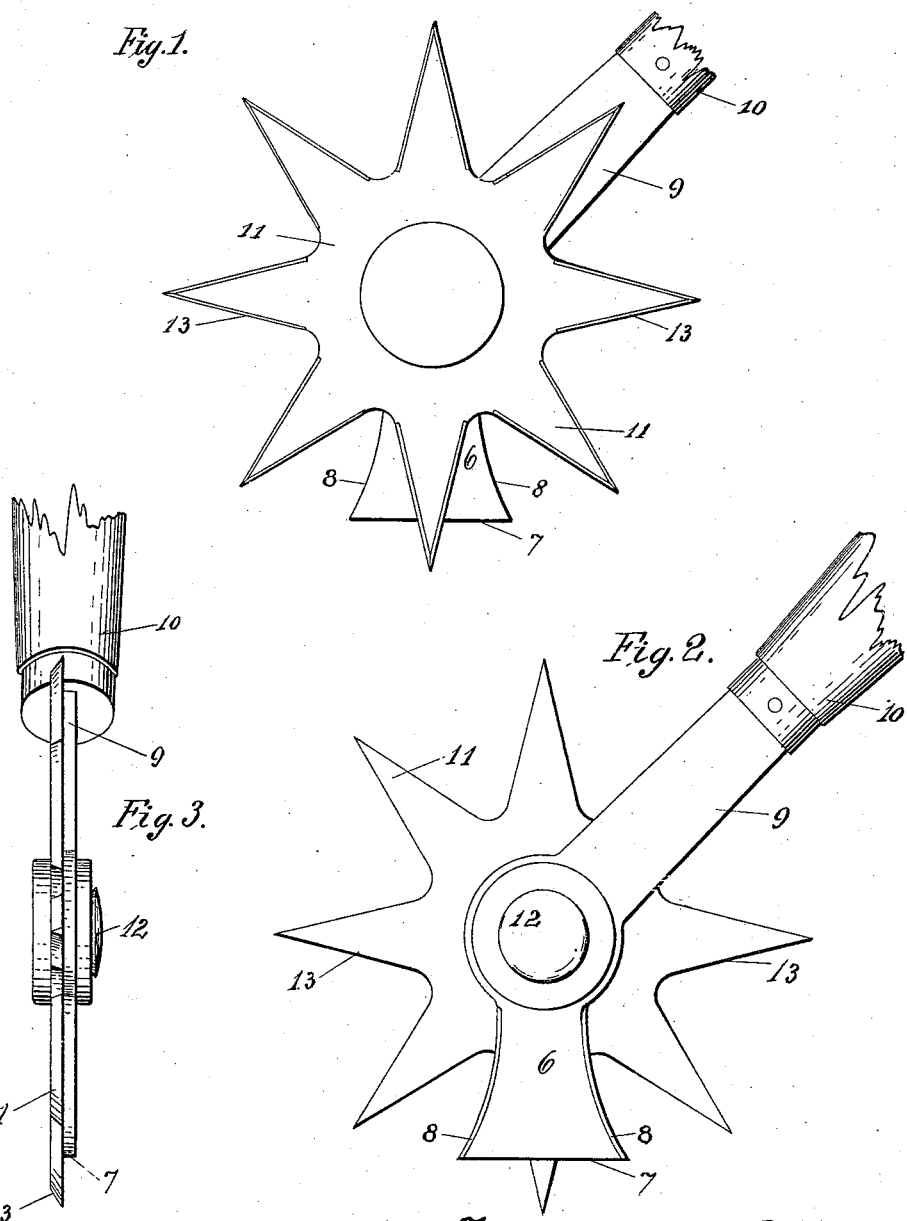

FREDERICK W. THEBERATH, OF LAKEWOOD, OHIO.

LAWN-EDGE TRIMMER.

No. 872,861.     Specification of Letters Patent.     Patented Dec. 3, 1907.

Application filed July 9, 1907. Serial No. 382,924.

*To all whom it may concern:*

Be it known that I, FREDERICK W. THE-BERATH, citizen of the United States, residing at Lakewood, in the county of Cuyahoga and State of Ohio, have invented certain new and useful Improvements in Lawn-Edge Trimmers, of which the following is a specification.

This invention is a lawn edge trimmer adapted to be used in cutting the grass and sod at the edges of lawns.

The object of the invention is to form a device which will quickly and readily do this work and which can be run from a walking position.

The device comprises a rotary cutter which coöperates with a fixed or stationary blade which is secured to the operating handle, the cutter being rotated by movement of the implement along the grass or sod.

In the accompanying drawings, Figures 1 and 2 are opposite side views of the implement. Fig. 3 is a top or edge view.

Referring specifically to the drawings, 6 indicates a fixed blade or cutter. This is made or cut off square at the bottom edge as indicated at 7, and is beveled to form cutting edges on opposite sides, as indicated at 8. This blade is formed integral with a shank 9 to which the long wooden handle 10 is affixed in any suitable manner.

A star wheel 11 is mounted in contact with the cutter edge and turns on the central connecting pivot 12. The points or branches of the star wheel are beveled and sharpened on opposite sides, as indicated at 13, and these cutting edges coöperate or form shears with the cutting edges 8 of the fixed blade. This blade is of less length than the points of the star wheel, which thereby projects below the square end of the blade 6 in position to enter into the ground as the trimmer is moved along. The wheel is thus driven or rotated by pushing or pulling the device along the edge of the lawn to be trimmed, and it is obvious that it will cut in either direction, since the points of the star wheel are sharpened on both sides and so is the blade 6.

The device will save the slow and tiresome manner of trimming lawns with hand shears or cutters, and the absence of gearing or other mechanical driving means permits the device to be produced at a very low cost.

I claim:

A device of the kind stated, comprising a blade cut off square at the lower end and sharpened on opposite edges and having a handle fixed thereto, and a star wheel rotatable beside the blade and having points sharpened on both edges and projecting at their tips below the blade.

In testimony whereof I do affix my signature, in presence of two witnesses.

FREDERICK W. THEBERATH.

Witnesses:
   JOHN A. BOMMHARDT,
   NETTIE J. SCHAUM.